United States Patent [19]

Petranyi

[11] E Re. 29,184

[45] Reissued Apr. 19, 1977

[54] APPARATUS FOR DISPENSING LIQUID FROM A LIQUID SUPPLY MANIFOLD

[75] Inventor: John F. Petranyi, Madison, Wis.

[73] Assignee: DEC International, Inc., Madison, Wis.

[22] Filed: May 27, 1976

[21] Appl. No.: 690,531

Related U.S. Patent Documents

Reissue of:

[64] Patent No.: 3,815,792
Issued: June 11, 1974
Appl. No.: 304,367
Filed: Nov. 7, 1972

[52] U.S. Cl. ..... 222/373; 137/392
[51] Int. Cl.[2] ..... B67D 5/52
[58] Field of Search ..... 222/373, 56, 318, 61, 222/132, 51, 64, 442, 444; 137/156, 392

[56] References Cited

UNITED STATES PATENTS

| | | | |
|---|---|---|---|
| 2,526,331 | 10/1950 | Copping | 222/373 X |
| 3,194,434 | 7/1965 | Evanson | 137/156 X |
| 3,221,933 | 12/1965 | Small et al. | 222/373 X |
| 3,495,743 | 2/1970 | Mohr et al. | 222/318 |
| 3,537,472 | 11/1970 | Yulio | 137/392 |

*Primary Examiner*—Stanley H. Tollberg
*Attorney, Agent, or Firm*—Michael, Best & Friedrich

[57] ABSTRACT

A liquid dispensing system including a liquid supply manifold connected to a liquid dispensing reservoir. A check valve is interposed between the manifold and the reservoir to permit liquid flow from the manifold to the reservoir and to prevent reverse flow from the reservoir to the manifold. A dispenser outlet is connected to the reservoir and a dispenser valve is provided thereat to control liquid flow from the dispenser outlet. A source of air under pressure is connected to the reservoir and a control valve is provided to alternately place the reservoir into communication with the source of air under pressure and then subsequently cut off the source of air pressure and place the reservoir into communication with the atmosphere. During the period the reservoir is placed in communication with the air under pressure, the liquid dispenser valve is opened to thereby cause a quantity of liquid to be dispensed from the reservoir out through the dispenser outlet.

The manifold assembly includes a plurality of liquid containers connected thereto with the container closest to the reservoir being at a lower elevation than the next adjacent container and so on up the line to the last container which is located at the highest elevation. The end of the reservoir adjacent the last container is open to the atmosphere. With this arrangement liquid flowing from the manifold to displace the liquid dispensed from the reservoir will be supplied first from the container at the highest elevation and then from the container at the second highest elevation and so on down the line to the container at the lowest elevation.

16 Claims, 9 Drawing Figures

Fig. 8
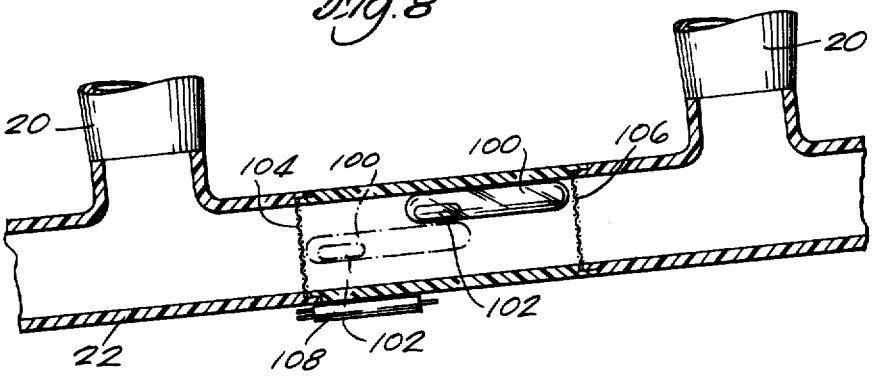
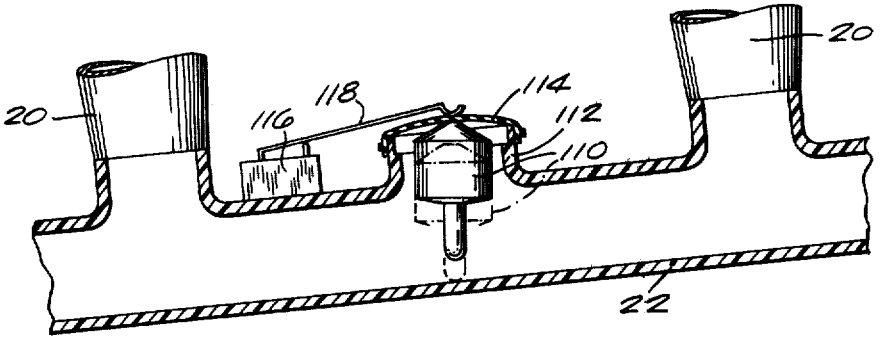
Fig. 9

APPARATUS FOR DISPENSING LIQUID FROM A LIQUID SUPPLY MANIFOLD

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method and apparatus for dispensing liquid from a container and relates specifically to a system for dispensing liquor designed for use in bars, restaurants and similar establishments.

2. Description of the Prior Art

In many prior systems the liquor supply is placed under pressure for purposes of forcing it from the system through a liquid dispenser. This means, of course, that in replenishing the supply, care must be taken to shut off the air pressure at the point at which the supply is replenished. Furthermore, during operation care must be taken to prevent rupture of the liquor bottles due to excessive pressures. Also, in pressure systems of the type described above, the liquor bottles are generally connected in series wherein liquor from one bottle must pass through the next adjacent bottle and on through the system. Such an arrangement is objectional since it may be in violation of certain state statutes and local ordinances which prohibit the refilling and subsequent dispensing of liquor from a liquor bottle. The present invention eliminates these problems by providing a system wherein the liquor replenishing supply arrangement is designed to replenish the liquid dispensed from the system by gravity flow. The system also contemplates a manifold arrangement wherein the respective liquor bottles are emptied one at a time, there being no flow from one bottle to another. Finally, the system contemplates a dispenser reservoir which can be isolated from the supply manifold wherein liquid can be dispensed therefrom under pressure to provide a relatively fast pour which can be accurately controlled.

SUMMARY OF THE INVENTION

A liquid dispensing system comprising a liquid dispensing reservoir and a liquid supply container in fluid communication with the reservoir. A check valve is interposed between the supply container and the reservoir to permit flow by gravity from the container to the reservoir and to prevent reverse flow from the reservoir back into the supply container. A liquid dispenser conduit is connected to the outlet of the reservoir and at each dispensing station a valve is provided to control liquid flow from the reservoir. A source of air under pressure is connected to the liquid reservoir and a control valve means is provided to alternately place the reservoir into communication with the compressed air source and subsequently shut off such communication and place the reservoir in communication with the atmosphere to allow liquid to flow by gravity from the manifold to the reservoir to thereby replenish the liquid dispensed from the reservoir during the period it was connected to the compressed air source.

DESCRIPTION OF THE DRAWINGS

FIGS. 8 and 9 are fragmentary side elevation views (with parts broken away) showing alternative arrangements for sensing the liquid level in the system.

DESCRIPTION OF THE PREFERRED EMBODIMENT

Figures 1, 7:
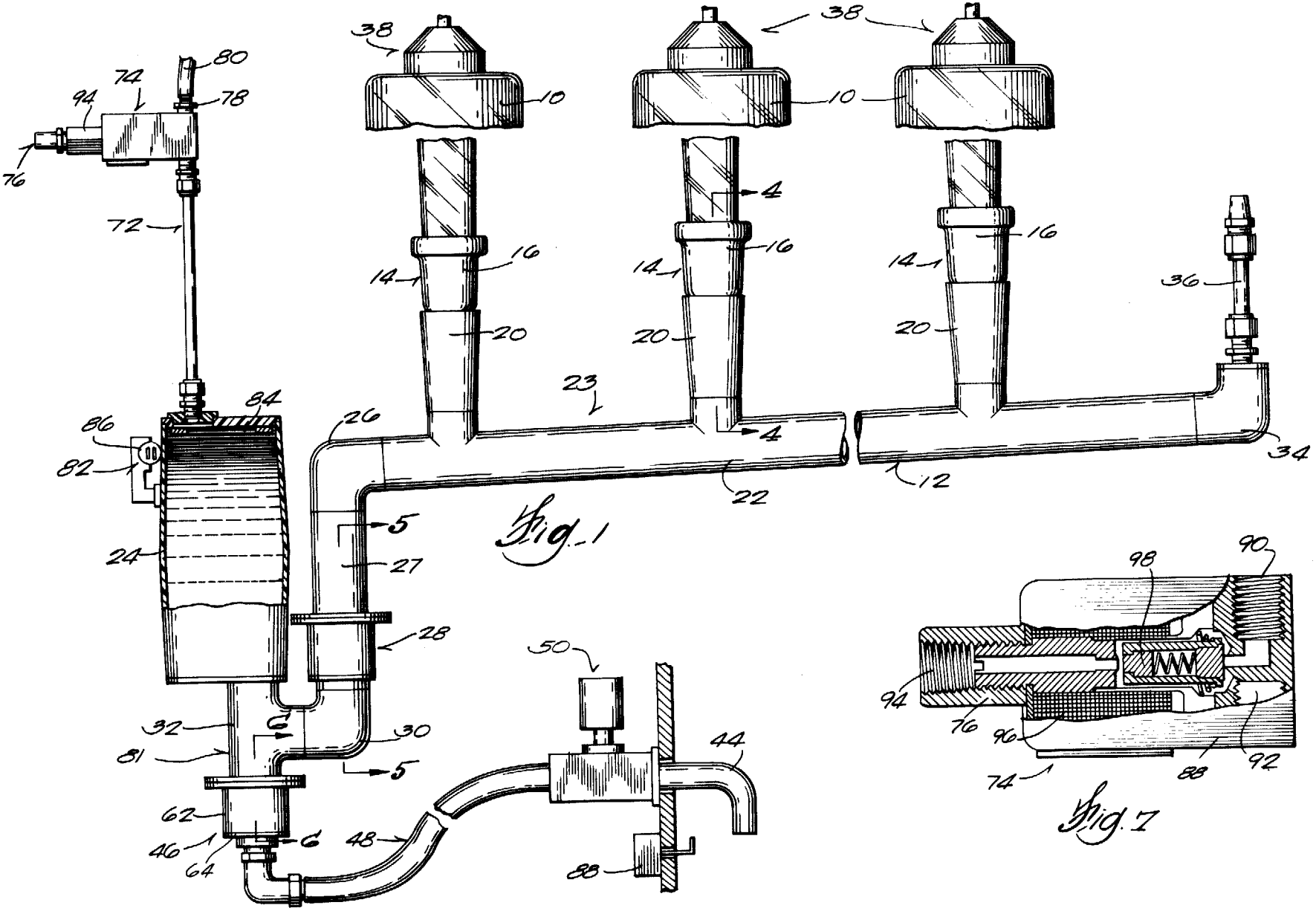
FIG. 1 is a partially schematic side elevation view with certain parts broken away, showing the liquid dispensing system of the present invention.
FIG. 7 is an enlarged view with parts broken away of the three-way solenoid operated control valve identified by reference numeral 74 in FIG. 1.
Figure 2:
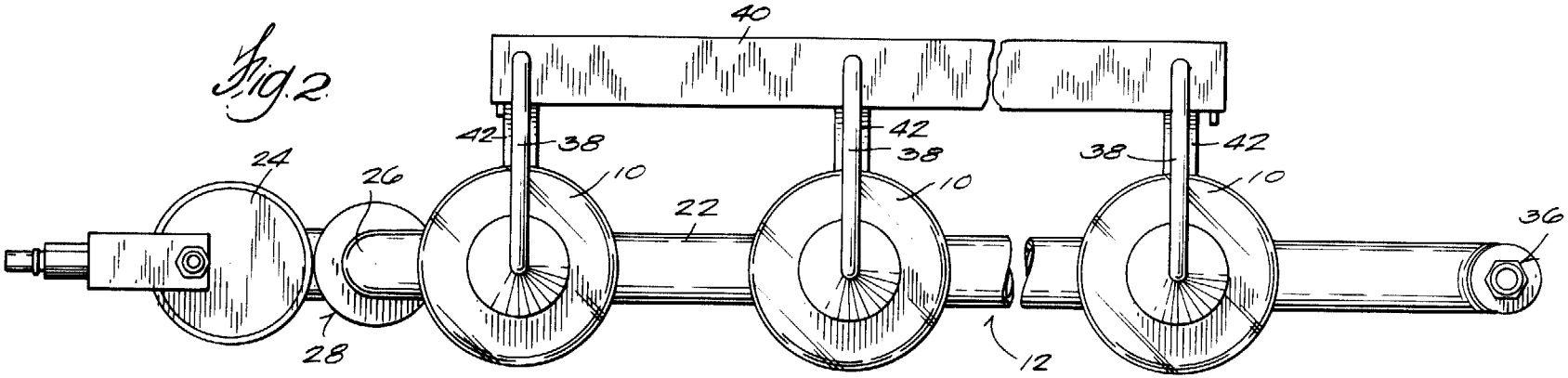
FIG. 2 is a top plan view of the dispensing system shown in FIG. 1.

Referring to the drawings in detail, FIG. 1 shows the general layout of the system wherein a plurality of liquor bottles 10 (generally quarts or half-gallons) are mounted in an upside down position on a manifold assembly 12.

Figure 4:
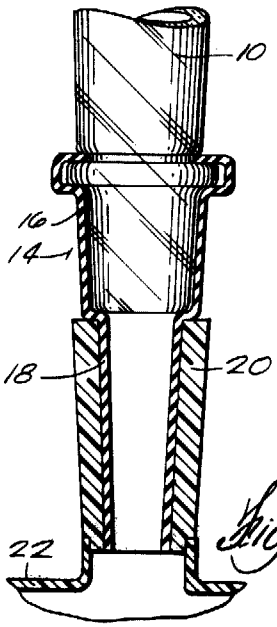
FIG. 4 is a sectional view taken along line 4—4 of FIG. 1.

The mounting procedure is as follows. After a full bottle of liquor is uncapped, a rubber nozzle 14 having a base portion 16 and a tip portion 18 (FIG. 4) is fitted over the bottle neck with the base portion 16 of the nozzle in sealed engagement with the bottle. To install a filled bottle on the manifold assembly 12, the tip portion 18 is either bent over or pinched shut by the operator. The bottle is then inverted and the tip portion is slipped inside one of the spout members 20 of the manifold assembly 12. The inside surface of spout 20 is tapered slightly to provide a sealed fit between the spout and the tip portion 18 of the nozzle 14.

Figure 3:
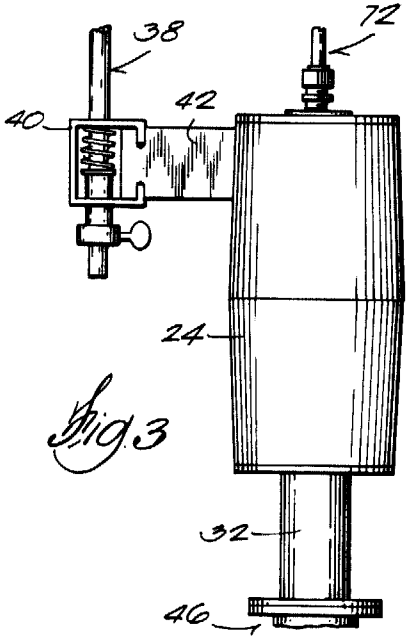
FIG. 3 is a fragmentary end elevation view of the system shown in FIG. 1.

The bottles 10 are held securely in inverted position on the manifold by means of spring loaded clamp rod assemblies 38 which are adapted to engage and grip the bottom of each bottle 10. As shown in FIG. 3, assemblies 38 are supported on a channel member 40. Channel member 40 and manifold assembly 12 are fastened together by means of a plurality of bracket members 42. The number of bottles 10 mounted on a single manifold assembly will vary depending on the requirements of the application, space limitations and other factors.

The horizontal leg 22 of manifold assembly 12 communicates with the bottom portion of a reservoir 24 by means of an elbow 26, a vertical tube 27, a check valve assembly 28, an elbow 30 and a tee 32. The end of horizontal leg 22 of the manifold communicates with the atmosphere through an elbow 34 and a breather tube assembly 36 as shown in FIG. 1. For reasons to be explained in detail hereinafter, leg 22 of the manifold assembly is not exactly horizontal but instead slopes upward from left to right (as viewed in FIG. 1) at an angle of approximately 2°–3°. The several filled bottles and manifold assembly can be considered together as a single liquid supply container means 23.

Figure 5:
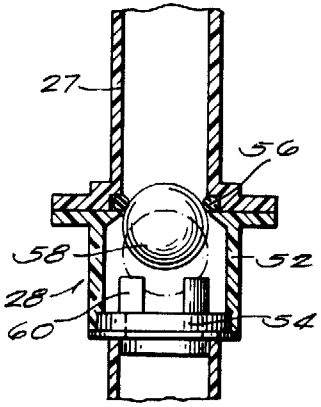
FIG. 5 is a sectional view taken along line 5—5 of FIG. 1.
Figure 6:
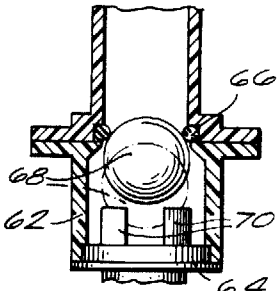
FIG. 6 is a sectional view taken along line 6—6 of FIG. 1.

The reservoir 24 also communicates with a liquid dispenser nozzle 44 through tee 32, a check valve assembly 46, a conduit means 48 and a solenoid operated valve means 50. Check valve assemblies 28 and 46 may be of any suitable design. In the preferred embodiment valve assembly 28 (FIG. 5) is comprised of a valve body 52, a ball stop member 54 mounted in the lower end of body 52, an O-ring member 56 mounted at the upper end of body 52 and a ball member 58 mounted inside body 52. In operation ball 58 moves between an open position (shown in dotted lines) wherein the ball rests on upstanding legs 60 of ball stop 54 and a closed position (shown in solid lines) wherein the ball is seated against the O-ring member 56. Similarly, valve assembly 46 (FIG. 6) is comprised of a valve body 62, a ball stop member 64 mounted in the lower end of body 62, an O-ring member 66 mounted at the upper end of body 62 and a ball member 68 mounted inside body 62. In operation ball 68 moves between an open position (shown in dotted lines) wherein the ball rests on upstanding legs 70 of ball stop 64 and a closed position (shown in solid lines) wherein the ball is seated against the O-ring member 66.

A tube assembly 72 is connected to the top portion of reservoir 24 and a three-way solenoid valve means 74 is connected to the end of the tube assembly. Valve 74, when in its de-energized position, places tube assembly 72 and reservoir 24 into communication with the atmosphere through a breather tube 76. When the valve 74 is energized, tube assembly 72 and reservoir 24 are placed into communication with a source of air under pressure (not shown) by means of a nipple 78 and a tube 80. Since tube 72, reservoir 24, tee 32 and elbow 30 are in constant communication with each other they can be considered together as comprising a single dispensing reservoir means or system 81.

A liquid level sensing means 82 is provided for sensing the level of liquid in reservoir 24. In one embodiment (FIG. 1) a sensing means is comprised of a floating magnetic member 84 and a reed switch means 86 mounted on the exterior of the reservoir as shown at the level at which it is desired to sense the liquid level. In operation when the level in reservoir 24 reaches the level of reed switch 86, floating magnetic member 84 will activate the reed switch to its closed position. This will close an electric circuit and energize some kind of warning device such as a buzzer or warning light located at the dispensing station for the system.

FIGS. 8 and 9 show alternative arrangements for sensing the level of the liquid in the system. In the FIG. 8 embodiment a cigar-shaped hollow capsule 100 having a magnet 102 therein is positioned in the horizontal leg 22 of the manifold as shown. A pair of grate-like retainer members 104, 106 are provided to retain the capsule in the desired location. A reed switch 108 is mounted adjacent the lower surface of leg 22 and is electrically connected to some kind of a warning device. As the liquid level in the system drops, the capsule 100 and magnet 102 will descend closer and closer to switch 108 until the magnetic lines of force become great enough to actuate the switch.

In the FIG. 9 embodiment a plunger-like float 110 is mounted in a cylindrical housing 112 formed in the horizontal leg 22 of the manifold. A flexible membrane 114 is mounted across the top of housing 112 and is positioned to cooperate with an actuating arm 118 of a snap action switch 116 so that when the liquid level drops, float 110 will descend causing membrane 114 to be deflected downwardly by the arm 118. Downward deflection of arm 118 will close switch 116 which in turn will energize a warning device.

While the construction of three-way valve means 74 can be of any suitable design, FIG. 7 shows one of the several acceptable types. As shown, valve 74 is comprised of a body 88 having three ports, 90, 92 and 94, for connection to the source of compressed air, the reservoir tube 72 and the breather tube 76, respectively. The valve contains a solenoid 96 for actuation of a splined valve plunger 98. With the valve 74 deenergized (FIG. 7) port 92 will communicate through the valve body with port 94 and under such condition port 90 will be shut off. When the valve is energized, solenoid 96 will actuate valve plunger to the left as viewed in FIG. 7 causing ports 90 and 92 to be placed in communication through the valve body and causing port 94 to be shut off.

OPERATION OF PREFERRED EMBODIMENT

To use the above described liquid dispensing system the manifold assembly 12 is first fully loaded with full bottles 10 of liquor. The particular procedure recommended for connecting individual bottles to the spouts 20 of the manifold assembly has been described previously. However, it should be pointed out that the preferred sequence for installing bottles is to start by connecting a full bottle to the spout 20 nearest reservoir 24 which is the spout at the lowest elevation and then to move to the next higher spout and then to the next higher spout and so on until the manifold has been completely loaded. The number of bottles which can be accommodated by the manifold 12 can vary depending on the length of the manifold. For most installations a six-bottle manifold will be suitable.

After the first bottle has been connected to the manifold described above, liquid will flow by gravity into the system, filling up reservoir 24 and horizontal leg 22 of the manifold assembly 12. The reservoir is designed so that it will be filled to the top after about six bottles have been installed on the manifold. Tube 72 will start to fill up as additional bottles above six are added.

With bottles 10 connected to all manifold nozzles, the system is ready for use, however, the system could operate without a full complement of bottles in which event the empty spouts would be capped to keep out dust and dirt. To dispense liquid from the system the operator (the bartender in a liquor installation) will actuate a switch 88 (shown schematically in FIG. 1) which is wired to simultaneously energize three-way solenoid valve 74 and the dispensing solenoid valve 50.

As explained previously, energization of three-way valve 74 will place the liquid in tube 72 and reservoir 24 in communication with a source of compressed air. With dispensing valve 50 energized to its open position, the air pressure applied to the reservoir through valve 74 will cause liquid to flow under pressure from reservoir 24 through tee 32, check valve assembly 46, conduit 48, valve 50 and then out through dispenser 44. It will be appreciated that the flow under pressure from reservoir 24 will cause check valve 28 to close to thus prevent any flow of liquid back into the manifold. It will also be appreciated that upon initial start-up of the system, it will be necessary to actuate switch 88 several times to force liquid through conduit 48 to the dispenser 44. This is particularly true where the elevation of dispenser 44 is at a higher elevation than the system.

The amount of pressure applied to the reservoir system 81 during the pressure dispensing cycle will vary depending primarily on the length of conduit 48 and the elevation of dispensing outlet 44 with respect to the rest of the system. For example, with a conduit length in the neighborhood of 200 feet and an elevation differential of about 12 feet a pour of one ounce in one second will require a pressure of about 25 p.s.i.g.

The amount of liquid which will be dispensed through dispenser outlet 44 will depend on the length of time valves 74 and 50 remain energized. This time interval can be controlled by the operator or if desired a timer means (not shown) can be employed to provide a predetermined period of energization (irrespective of how long switch 88 is depressed) which in turn will result in a predetermined amount of liquid dispensed each time the valves are energized by actuation of switch 88.

To terminate the dispensing phase of the overall operation valves 50 and 74 are de-energized simultaneously causing valve 50 to close and causing valve 74 to cut off communication between the reservoir and the source of compressed air and at the same time vent the reservoir by placing it in communication with the atmosphere through breather tube 76.

The closing of valve 50 will, of course, shut off flow of liquid through dispenser outlet 44. With valve 50 closed and with the reservoir vented to atmosphere, air will flow into the manifold system through breather tube 36 and will flow back through horizontal leg 22 of the manifold until it reaches the highest spout 20 at which point it will rise up through the liquid in the bottle, causing a displacement of liquid therefrom. The liquid displaced from the highest bottle will cause liquid to flow by gravity from the manifold through check valve 28 to thereby replace the liquid previously dispensed from the reservoir system 81 through dispenser outlet 44. When the entire system reaches equilibrium, all flow will stop.

It will be appreciated that as additional amounts of liquid are dispensed from the system in the manner described above, the dispensed amounts will continue to be displaced from the highest bottle (the bottle closest to breather tube 36) until such bottle is completely empty. After the highest bottle at the end of the manifold is emptied, the next highest bottle will be emptied and so on down the line until all bottles are emptied.

The presence of check valve 46 in the system is of particular importance in installations wherein dispenser outlet 44 is located at a substantially higher elevation than the rest of the system. This check valve 46 holds the column of liquid back when the line (or lines) to the dispenser station are initially filled and prevents flow back into the system in the event solenoid valve 50 develops a leak or fails to close for any reason.

In normal operation the system will usually be checked visually before all bottles are emptied. Assuming a system having a six bottle manifold, with four of the six bottles empty, to reload the system the operator simply removes the four empty bottles and replaces them with full bottles as described previously, keeping in mind that in doing so full bottles are connected to the lowest open manifold nozzle first and then up the line to the highest.

It is important to note at this point that empty bottles can be replaced with full bottles as described above without taking the system out of operation. This is because check valve 28 prevents back flow into the manifold during the pressure dispensing cycle of the operation. When this cycle is terminated, replacement liquid will flow by gravity into the reservoir system 81 from the then highest remaining bottle on the manifold in which liquid is still present.

The floating magnetic member 84 and reed switch 82 combination installed on reservoir 24 provide a means for alerting the operator when the liquid level in the system reaches a point wherein replenishment is necessary. The reed switch 82 is positioned at an elevation wherein a signal will be given at about the time the next to lowest bottle becomes empty. In the system shown in FIG. 1 this will be accomplished by positioning reed switch 82 at the upper portion of the reservoir as shown. The alternative liquid level sensing arrangements shown in FIGS. 8 and 9 function as described previously to provide the same general objective, namely, to alert the operator when the liquid level reaches a predetermined low level.

It will be appreciated from the foregoing description that the dispensing system shown and described provides a relatively simple, easily operated and effective arrangement for dispensing liquor and other liquids. The gravity feed displacement manifold eliminates the need for pressurizing the bottles and thus eliminates the possibility of bottle failure and the need for a complex valving arrangement to relieve the system of pressure for purposes of replacing empty bottles. The use of a pressure dispensing cycle for dispensing liquid makes it possible to provide a relatively fast pour wherein the volume dispensed can be accurately controlled.

I claim:

[1. A liquid dispensing system comprising:

a liquid dispensing reservoir means;

a liquid supply container means in fluid communication with said reservoir means, said container means being vented to atmosphere;

a check valve means interposed between said container means and said reservoir means to permit liquid flow from said container means to said reservoir means and to prevent reverse flow from said reservoir means to said container means;

a liquid dispenser outlet means in fluid communication with said liquid dispensing reservoir means;

a liquid dispenser valve means adapted to control liquid flow through said outlet means;

a source of air under pressure connected to said liquid dispensing reservoir means;

a vent means to atmosphere connected to said liquid dispensing reservoir means; and a control valve means associated with said liquid dispensing reservoir means, said source of air under pressure and said reservoir vent means, said control valve means operative to alternately place said reservoir means into communication with said source of air under pressure and subsequently cut off said source of air under pressure and place said reservoir means into communication with the atmosphere through said vent means.]

[2. A liquid dispensing system according to claim 1 in which there is a second check valve means located at the outlet from said liquid dispensing reservoir means to permit flow from said liquid dispensing reservoir means to said liquid dispenser outlet means and to prevent reverse flow from said outlet means to said reservoir means.]

[3. A liquid dispensing system according to claim 1 in which said liquid dispenser valve means and said control valve means are both actuated by electric solenoids, said solenoids being electrically connected to a single switch means so that they can be energized simultaneously.]

[4. A liquid dispensing system according to claim 1 in which said liquid supply container means is comprised of a manifold assembly and a plurality of liquid containers removably connected to said manifold assembly with one end of said manifold assembly being connected to said liquid dispensing reservoir means and the other end of said assembly being vented to the atmosphere.]

[5. A liquid dispensing system according to claim 4 in which said liquid containers are mounted on said manifold in such a way so that the elevation of the container at said other end of said manifold assembly is higher than the next adjacent container and so on down the line of containers to the container at said one end of said manifold assembly, which container is at an elevation lower than all of the other containers.]

[6. A liquid dispensing system according to claim 5 in which said liquid containers are bottles which have been inverted and then connected to said manifold while in inverted position so that the liquid in said bottles will flow by gravity from said bottles into said manifold assembly and then into said liquid dispensing reservoir means.]

[7. A liquid dispensing system according to claim 1 in which said control valve means is comprised of a threeway valve having a first and second position, said valve operable when in said first position to place said liquid dispensing reservoir means into communication with said source of air under pressure and at the same time shut off communication between said reservoir and said reservoir vent means, said valve being further operable when in said second position to place said liquid dispensing reservoir means into communication with the atmosphere through said reservoir vent means and at the same time to cut off communication between said liquid dispensing reservoir means and said source of air under pressure.]

[8. A liquid dispensing system according to claim 1 in which there is a liquid level sensing means for sensing the level of the liquid in the system and for energizing a warning means when the liquid level reaches a predetermined level.]

[9. A liquid dispensing system according to claim 8 in which said liquid level sensing means is comprised of a floating magnetic member positioned within the liquid system and a reed switch means mounted on the exterior of the system adjacent said floating magnetic member, said magnetic member operable to actuate said reed switch means when the liquid level in the system reaches a predetermined level.]

[10. A liquid dispensing system according to claim 8 in which said liquid level sensing means is comprised of a float member mounted within the liquid system, a flexible membrane exposed to the exterior of the system and positioned for contact by said float member for movement in response to corresponding movement of said float member, and a switch means having an actuating arm operatively associated with said membrane for actuation of said switch means in response to movement of said membrane.]

[11. A liquid dispensing system according to claim 8 in which said control valve means is comprised of a three-way valve having a first and second position, said valve operable when in said first position to place said liquid dispensing reservoir means into communication with said source of air under pressure and at the same time to shut off communication between said reservoir and said reservoir vent means to thereby cause liquid to flow under pressure from said reservoir out through said dispenser outlet, said valve means further operable when in said second position to place said liquid dispensing reservoir into communication with the atmosphere through said reservoir vent means and at the same time to cut off communication between said liquid dispensing reservoir means and said source of air under pressure to thereby allow liquid to flow by gravity from said container means to said reservoir means.]

[12. A liquid dispensing system according to claim 11 in which said three-way valve and said liquid dispenser valve are operatively connected to each other so that when said three-way valve is actuated to its second position, said liquid dispensing valve will be actuated to its open position.]

*13. A liquid dispensing system comprising:*

*a liquid dispensing reservoir means,*

*a liquid supply container means in fluid communication with said reservoir means, said container means comprising a manifold assembly and a plurality of liquid containers removably connected to said manifold assembly with one end of said manifold assembly being connected to said liquid reservoir means and the other end of said assembly being connected to the atmosphere, said liquid containers being bottles which have been inverted and then connected to said manifold while in inverted position so that the fluid in said bottles will flow by gravity from said bottles into said manifold assembly and then into said liquid dispensing reservoir means, said bottles being mounted on said manifold in such a way so that the elevation of the bottle at said other end of said manifold assembly is higher than the next adjacent bottle and so on down the line of bottles to the bottle at said one end of the manifold assembly, which bottle is at an elevation lower than all the other bottles;*

*a check valve means interposed between said container means and said reservoir means to permit liquid flow from said container means to said reservoir means and to prevent reverse flow from said reservoir means to said container means;*

*a liquid dispenser valve means adapted to control liquid flow through said outlet means;*

*a liquid dispenser means adapted to control liquid flow through said outlet means;*

*a source of air under pressure connected to said liquid dispensing reservoir means;*

*a vent means to atmosphere connected to said liquid dispensing reservoir means; and*

*a control valve means associated with said liquid dispensing reservoir means, said source of air under pressure and said reservoir vent means, said control valve means operative to alternately place said reservoir means into communication with said source of air under pressure and subsequently cut off said source of air under pressure and place said reservoir means into communication with the atmosphere through said vent means.*

*14. A liquid dispensing system according to claim 13 in which there is a second check valve means located at the outlet from said liquid dispensing reservoir means to permit flow from said liquid dispensing reservoir means to said liquid dispenser outlet means and to prevent reverse flow from said outlet means to said reservoir means.*

*15. A liquid dispensing system according to claim 13 in which said liquid dispenser valve means and said control valve means are both actuated by electric solenoids, said solenoids being electrically connected to a single switch means so that they can be energized simultaneously.*

*16. A liquid dispensing system according to claim 13 in which said control valve means is comprised of a three-way valve having a first and second position, said valve operable when in said first position to place said liquid dispensing reservoir means into communication with said source of air under pressure and at the same time shut off communication between said reservoir and said reservoir vent means, said valve being further operable when in said second position to place said liquid dispensing reservoir means into communication with the atmosphere through said reservoir vent means and at the same time to cut off communication between said liquid dispensing reservoir means and said source of air under pressure.*

*17. A liquid dispensing system according to claim 13 in which there is a liquid level sensing means for sensing the level of the liquid in the system and for energizing a warning means when the liquid level reaches a predetermined level.*

*18. A liquid dispensing system according to claim 17 in which said liquid level sensing means is comprised of a floating magnetic member positioned within the liquid system and a reed switch means mounted on the exterior of the system adjacent said floating magnetic member, said magnetic member operable to actuate said reed switch means when the liquid level in the system reaches a predetermined level.*

*19. A liquid dispensing system according to claim 17 in which said liquid level sensing means is comprised of a float member mounted within the liquid system, a flexible membrane exposed to the exterior of the system and positioned for contact by said float member for movement in response to corresponding movement of said float member, and a switch means having an actuating arm operatively associated with said membrane for actuation of said switch means in response to movement of said membrane.*

*20. A liquid dispensing system according to claim 17 in which said control valve means is comprised of a three-way valve having a first and second position, said valve operable when in said first position to place said liquid dispensing reservoir means into communication with said source of air under pressure and at the same time to shut off communication between said reservoir and said reservoir vent means to thereby cause liquid to flow under pressure from said reservoir out through said dispenser outlet, said valve means further operable when in said second position to place said liquid dispensing reservoir into communication with the atmosphere through said reservoir vent means and at the same time to cut off communication between said liquid dispensing reservoir means and said source of air under pressure to thereby allow liquid to flow by gravity from said container means to said reservoir means.*

*21. A liquid dispensing system according to claim 20 in which said three-way valve and said liquid dispenser valve are operatively connected to each other so that when said three-way valve is actuated to its second position, said liquid dispensing valve will be actuated to its open position.*

*22. A liquor dispensing system comprising:*

*a liquor dispensing reservoir;*

*a liquor supply container means including a manifold assembly comprising a leg portion and a plurality of spout members mounted on the leg portion in spaced relationship with each other and in fluid communication with said leg portion, said spout members adapted to receive the necks of liquor containers for fluid connection therewith when the liquor containers are positioned in an inverted position, said manifold assembly further including a sealing means for sealing the necks of the liquor containers in said spout members, said manifold assembly serving to support the weight of the liquor containers and the contents thereof, said points of fluid communication between said spout members and said leg portion being at successively lower elevations from one end of said leg portion to the other, said one end of said leg portion being vented to atmosphere through a manifold breather tube and said other end of said leg portion connected to said liquor dispensing reservoir, said breather tube extending upwardly from said one end of said leg portion to an elevation higher than that of the liquor level in said manifold assembly;*

*a first check valve means interposed between said container means and said reservoir to permit liquid flow from said container means to said reservoir and to prevent reverse flow from said reservoir to said container means;*

*a liquor dispenser outlet means in fluid communication with said liquor dispensing reservoir;*

*a second check valve means in said liquor dispenser outlet means;*

*a liquor dispenser valve means adapted to control liquor flow through said outlet means;*

*a source of air under pressure connected to said liquor dispensing reservoir;*

*a vent means to atmosphere connected to said liquor dispensing reservoir means, said vent to atmosphere being at an elevation higher than that of the liquor level in said manifold assembly; and*

*a control valve means associated with said liquor dispensing reservoir, said source of air under pressure and said reservoir vent means, said control valve means operative to alternately place said reservoir in communication with said source of air under pressure and subsequently cut off said source of air under pressure and place said reservoir into communication with the atmosphere through said reservoir vent means, said liquor dispenser valve means and said control valve means both actuated by electric solenoids, said solenoids being electrically connected to a dispenser switch means so that they can be energized simultaneously by the operator, said liquor dispenser valve means and said control valve means adapted when so energized to place the liquor in the liquor dispensing reservoir into communication with said source of air under pressure causing liquor to flow under pressure from said liquor dispensing reservoir, through said liquor dispensing outlet means and out through said liquor dispensing valve means, said liquor dispensing valve means and said control valve means further adapted when de-energized to shut off flow of liquor through said liquor dispenser valve means and to cut off communication between said liquor dispensing reservoir and said source of air under pressure at the same time vent said liquor dispensing reservoir to atmosphere which in turn will cause liquor to flow by gravity from said manifold assembly to said liquor dispensing reservoir after which air from atmosphere will flow into said manifold assembly through said manifold breather tube*

*which air will flow back through said leg portion of said manifold assembly until it reaches the highest spout having a container therein containing liquor at which point the air will rise up through the liquor in such container causing a displacement flow of liquor therefrom into said manifold assembly until the entire liquor system reaches equilibrium at which time flow will stop.*

*23. A liquor dispensing system according to claim 22 in which there is a timer means to maintain said liquor dispenser valve means and said control valve means energized for a predetermined period of time to thereby cause a predetermined volume of liquor to be dispensed each time said dispenser switch means is actuated by the operator.*

*24. A liquor dispensing system according to claim 23 in which the manifold assembly includes a plurality of clamp members which are adapted to engage and grip the bottom of each liquor container when mounted in the manifold in an inverted position.*

*25. A liquor dispensing system according to claim 22 in which said sealing means for sealing the necks of the liquor containers in said spout members is comprised of a nozzle member of resilient material having a base portion and a tip portion, said base portion adapted to fit over the neck of the container in sealed relationship therewith and said tip portion adapted to fit inside one of said spout members in sealed relationship therewith.*

*26. A liquor dispensing system according to claim 22 in which said control valve means is comprised of a three-way valve having a first and second position, said valve operable when in said first position to place said liquor dispensing reservoir into communication with said source of air under pressure and at the same time shut off communication between said reservoir and said reservoir vent means, said valve being further operable when in said second position to place said liquor dispensing reservoir into communication with the atmosphere through said reservoir vent means and at the same time to cut off communication between said liquor dispensing reservoir and said source of air under pressure.*

*27. A liquor dispensing system according to claim 22 in which there is a liquor level sensing means for sensing the level of the liquor in the system and for energizing a warning means when the liquor level reaches a predetermined level.*

*28. A liquor dispensing system comprising:*

*a liquor dispensing reservoir;*

*a liquor supply container means including a manifold assembly comprising a leg portion and a plurality of spout members mounted on the leg portion in spaced relationship with each other and in fluid communication with said leg portion, said spout members adapted to receive the necks of liquor containers for fluid connection therewith when the liquor containers are positioned in an inverted position, said manifold assembly further including a sealing means for sealing the necks of the liquor containers in said spout members, said manifold assembly serving to support the weight of the liquor containers and the contents thereof, said points of fluid communication between said spout members and said leg portion being at successively lower elevations from one end of said leg portion to the other, said one end of said leg portion being vented to atmosphere through a manifold breather tube and said other end of said leg portion connected to said liquor dispensing reservoir, said breather tube extending upwardly from said one end of said leg portion to an elevation higher than that of the liquor level in said manifold assembly;*

*a first check valve means interposed between said container means and said reservoir to permit liquid flow from said container means to said reservoir and to prevent reverse flow from said reservoir to said container means;*

*a liquor dispenser outlet means in fluid communication with said liquor dispensing reservoir;*

*a liquor dispenser valve means adapted to control liquid flow through said outlet means;*

*a source of air under pressure connected to said liquor dispensing reservoir;*

*a vent means to atmosphere connected to said liquor dispensing reservoir means, said vent to atmosphere being at an elevation higher than that of the liquor level in said manifold assembly; and*

*a control valve means associated with said liquor dispensing reservoir, said source of air under pressure and said reservoir vent means, said control valve means operative to alternately place said reservoir in communication with said source of air under pressure and subsequently cut off said source of air under pressure and place said reservoir into communication with the atmosphere through said reservoir vent means, said liquor dispenser valve means and said control valve means both actuated by electric solenoids, said solenoids being electrically connected to a dispenser switch means so that they can be energized simultaneously by the operator, said liquor dispenser valve means and said control valve means adapted when so energized to place the liquor in the liquor dispensing reservoir into communication with said source of air under pressure causing liquor to flow under pressure from said liquor dispensing reservoir, through said liquor dispensing outlet means and out through said liquor dispensing valve means, said liquor dispensing valve means and said control valve means further adapted when de-energized to shut off flow of liquor through said liquor dispenser valve means and to cut off communication between said liquor dispensing reservoir and said source of air under pressure at the same time vent said liquor dispensing reservoir to atmosphere which in turn will cause liquor to flow by gravity from said manifold assembly to said liquor dispensing reservoir after which air from atmosphere will flow into said manifold assembly through said manifold breather tube which air will flow back through said leg portion of said manifold assembly until it reaches the highest spout having a container therein containing liquor at which point the air will rise up through the liquor in such container causing a displacement flow of liquor therefrom into said manifold assembly until the entire liquor system reaches equilibrium at which time flow will stop.*

* * * * *

UNITED STATES PATENT OFFICE

CERTIFICATE OF CORRECTION

Patent No. Re. 29,184 Dated April 19, 1977

Inventor(s) John F. Petranyi

It is certified that error appears in the above-identified patent and that said Letters Patent are hereby corrected as shown below:

Column 8, claim 13, lines 45 and 46, delete "a liquid dispenser valve means adapted to control liquid flow through said outlet means" and insert --a liquid dispenser outlet means in fluid communication with said liquid dispensing reservoir means--.

line 47, after "dispenser" insert --valve--.

Signed and Sealed this nineteenth Day of July 1977

[SEAL]

Attest:

RUTH C. MASON
Attesting Officer

C. MARSHALL DANN
Commissioner of Patents and Trademarks